Feb. 9, 1932.  W. BRASSERT ET AL  1,844,497

TILE SILO

Filed April 29, 1929

INVENTORS,
Walter Brassert, and
Glenn V. Gladville,
By Minturn & Minturn,
Attorneys.

Patented Feb. 9, 1932

1,844,497

UNITED STATES PATENT OFFICE

WALTER BRASSERT, OF KALAMAZOO, MICHIGAN, AND GLENN V. GLADVILLE, OF NASHVILLE, TENNESSEE, ASSIGNORS TO CONCRETE SILO COMPANY, OF BLOOMFIELD, INDIANA, A CORPORATION OF INDIANA

TILE SILO

Application filed April 29, 1929. Serial No. 358,848.

When silos were first constructed most of them were made of wood; this made a very satisfactory silo material as the insulating qualities of wood were favorable to the proper fermentation of the corn plant and to the proper keeping of ensilage. However, silos built of wood are subject to a number of destructive agencies, such as fire, wind, shrinking and swelling and decay, which rendered these silos short lived in most cases, besides necessitating frequent repair and adjustment, causing considerable expense of upkeep. The tendency has therefore been in recent years to construct silos of more durable and substantial material, so that they would not require much attention after being erected and that their life would be prolonged indefinitely. Silos were built of stone, clay-tile or brick laid up in mortar, of concrete in various applications, and of steel, but it can be readily seen that all of these types of silos have in them an element of weakness, which renders them of limited durability in resisting the action of silage before, during and after fermentation. Experience has shown that any of these so called permanent types of silos disclose to a marked degree after a limited number of years the destructive action of the ensilage. In many cases this destruction proceeds so rapidly that such silos can not be said to be even as lasting as wood silos.

There is one building material available, which has the quality of being strictly indestructible in contact with silage, and that is hard burned clay or shale in the form of brick or block. Silos built of such units could therefore be considered highly satisfactory from the standpoint of permanence if it were not for the fact that heretofore these units were always laid up in mortar, with steel enforcement laid in this mortar.

Such mortar, containing lime besides cement, is of course easily affected by the acids in ensilage and even by the juices in the corn plant which are released when the silo is first filled and before fermentation sets in. As a result there will be more or less leakage through the joints, the bond between mortar, tile, and steel reenforcement, will be destroyed and the silo wall will no longer have any strength to resist the outward pressure of the ensilage. It is a fact that a number of silos of this type have collapsed from this cause, and in many others the failure of the mortar joint is causing spoilage of ensilage near the wall through air entering between units.

The purposes of our invention are as follows:

1. To provide a building unit for the construction of silos which will not be affected by the destructive chemical action of silage and silage juices.

2. To provide a unit that will so fit into the silo wall that mortar or caulking used in tightening the joints between units will not be exposed to the destructive action of the silage and silage juices.

3. To provide a unit of such shape that the mortar or caulking used in the joints between units will be held or enclosed in such a way that it can not become dislocated under any circumstances.

4. In accomplishing the purposes set forth under 2 and 3, we have also made it possible to use a great variety of binding materials in the joints between units. As this material does not come in contact with the ensilage, we can use cement or mortar, whenever we want to obtain the extra strength and stiffness which the filling of the joints with such material will impart to the silo wall. We can also use such material as tar, which is inexpensive, easily available and has the further advantage that it will stick to the tile with great tenacity and does not shrink and crack, but retains its plasticity. Tar could not be used if it were exposed on the inside of the silo wall, as it would impart its objectionable odor to the contents.

5. To provide a silo wall of great structural strength so that silos can be built of large diameter, without danger of having such silos buckle under wind pressure, when empty.

6. To provide a unit that can easily be cut or ground to an exact standard of width and to a definite bevel, so that all units will fit easily and uniformly into the silo wall, greatly facilitating its proper construction even by unskilled labor.

We accomplish the above and other objects which will hereinafter appear by an embodiment which is illustrated in the accompanying drawings, in which—

Like characters of reference indicate like parts in the several views of the drawings.

Figure 1:
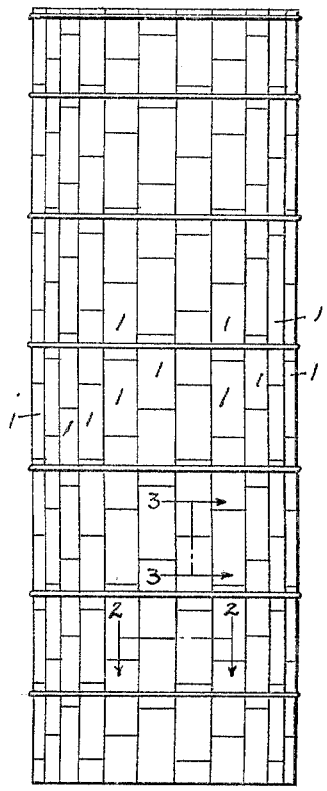
Fig. 1 is an elevation of a silo incorporating our invention.
Figure 3:
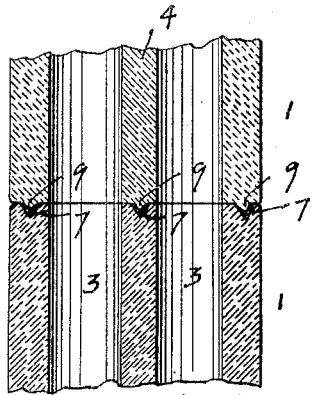
Fig. 3 is a vertical section on a larger scale on the line 3—3 of Fig. 1.
Figure 4:
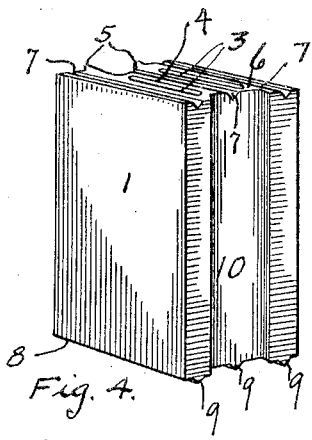
Fig. 4 is a perspective view of a silo block or tile showing the concave groove in one of its vertical edges.
Figure 5:
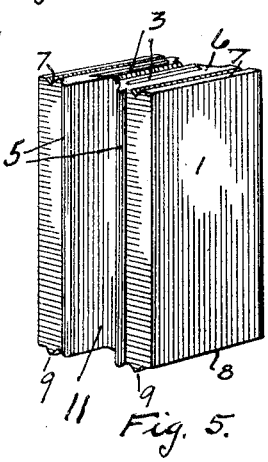
Fig. 5 is a like view showing the opposite edge of the silo block showing the placing ribs, at the channel edges.

1 are the silo blocks or tiles forming the walls of a round silo, and 2 are the supporting hoops preferably of iron rod.

In the embodiment of our invention shown in Figs. 2, 3, 4 and 5, there are two longitudinal hollow spaces 3, 3 one on each side of a central web 4. The two sides of each tile where they make vertical joints with adjacent tile are beveled on radial planes of the silo, and formed in each beveled side is a longitudinal central channel 10 and 11. The channel walls on one side are continued to form the sides of tongues 5, 5. The channel on the other side is wide enough to receive the two tongues 5, 5, the function of which is to assist in the assembly of the tile units in the erection of the silo.

The upper end 6 of the tile is horizontal and square and is provided with three parallel grooves 7, 7, 7, and the lower end 8 is parallel with end 6 and is provided with three tongues 9, 9, 9, opposite the grooves and of considerably less extension than the depth of the grooves, whereby, when the tiles are assembled one above the other in building a silo the tongues of one will enter the grooves of the other, leaving, however, a considerable space for the introduction of a suitable caulking material as tar, cement or mortar.

Figure 6:
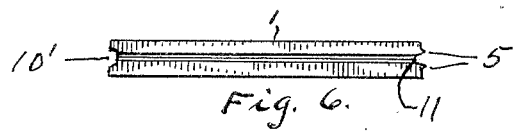
Fig. 6 is a top view of a modified form of silo block, of much less thickness and solid, with a single horizontal groove to receive a single tongue of an upper or lower block.
Figure 2:
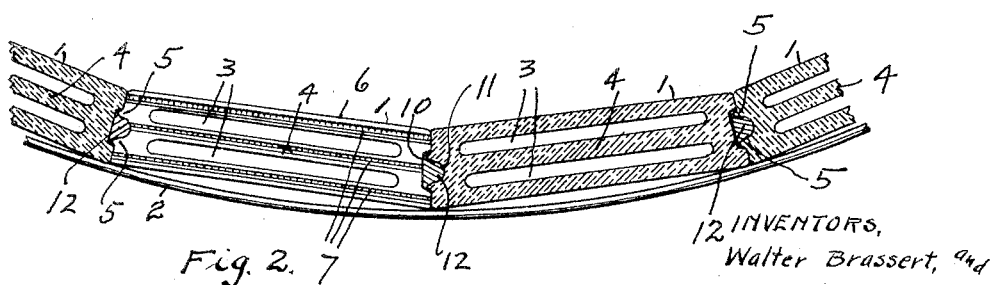
Fig. 2 is a horizontal section on a larger scale on the line 2—2 of Fig. 1.

The tile may have but a single hollow space and for small and inexpensive silos the hollow space may be entirely omitted as shown in the modification, Fig. 6, in which the vertical edge channels are retained and single tongues and grooves are provided in top and bottom ends.

The tiles are placed in kilns on end, several tiers high, the tongues in one end fitting loosely into the grooves in the other end of the next piece above or below.

After the tile have been burned they are put through a grinding machine, in which all are ground to a uniform width. At the same time they are given the correct bevel in accordance with the diameter of the silo for which they are intended. The amount of grinding necessary is here reduced to a minimum: In the first place the grinding wheels only touch on the two protruding surfaces on the sides of the staves; these need not be more than three-fourths of an inch wide each, and might be less, making a combined grinding surface one and one-half inches wide only. If a "ball and socket" type of joint had been chosen, such as is commonly encountered in concrete slab silo construction and also in the so called "book tile", the grinding surface would be the entire width of the stave and the grinding operation would be much more expensive. We are further providing different sets of moulding dies for the more common diameters of silos, such as ten feet, twelve feet, and fourteen feet. In this way the tile are already approximately accurate as to bevel of sides when they come from the kilns, which greatly lessens the amount of corrective grinding necessary.

On the grinding machine the tile are moved across the flat faces of two carborundum wheels of identical diameter, mounted on and revolving around the same horizontal shaft.

The tile are held on the moving bed of the grinding machine at an angle from the vertical; this angle varies in accordance with the bevel to which the tile are to be ground. Each wheel is approximately three-fourths of an inch wide and grinds one of the two protruding narrow faces at the sides of the tile. The longitudinal center of the tile is between the two grinding wheels and in this way the small tongues 5, 5, shown on one side of each tile, adjacent to the groove, will not be touched.

These small tongues 5, 5, as stated, merely serve to facilitate the placing of tile in the silo wall during construction. They have no other function and are not intended to add to the structural strength of the silo.

The structural strength is largely brought about by the fact that each tile is a perfectly fitting keystone between the two tiles on either side of it. It is enhanced by the breakage of the horizontal joints in a manner shown in Fig. 1, wherein the tile form spiral or oblique rows in two directions as well as vertical rows.

In the illustration of the tile we show three grooves in the ends and it must be understood that in ordinary silo construction it is necessary only to fill the inner groove with mortar or caulking material. In those cases where it is very essential that all moisture be kept from entering through the silo walls from the outside, it is best to fill the center and outer grooves also. The same is true where a tank is built out of the tile for holding liquids.

While the illustration shows a tile about four inches wide with a double row of hollow spaces on either side of a center web, a narower tile, with only one row of hollow spaces and only one or two grooves, and ridges in the ends of the horizontal joints, will answer the purposes especially for farm silos of small average diameter. It is also contemplated to use a thin tile without hollow spaces and only one groove and ridge on the ends of the horizontal joints, but otherwise shaped and beveled the same as the hollow tile herein described as shown in Fig. 6.

It is to be noted that whatever material 12 is placed in the vertical openings between adjacent tiles or such material as may be placed in any or all of the horizontal grooves 7, the adjacent tiles are in physical contact tile against tile on each side of such material, and that the material does not separate the tile surfaces or carry any of the load of the tiles.

Only enough material is placed in the grooves 7 to be contacted by the tongues 9 and pressed thereby to form an air seal, and not enough that would enter between the horizontal contacting faces of the tiles.

Having thus shown and described our invention in the best embodiment now known to us what we claim as new and desire to secure by Letters Patent is—

1. A hollow tile for silos having parallel top and bottom ends and a plurality of grooves extending longitudinally across one end and a like number of tongues extending correspondingly across the other end of much less projection than the depth of the grooves, said tile having its vertical joint sides accurately beveled on a radial plane of the silo and longitudinally channeled between appreciable bearing surfaces on each side of the channel, a channel on one side of the tile being narrower than the other and a tongue on one or both sides of the narrow channel adapted to enter the wide channel of an adjoining tile in a silo assembly.

2. In a silo the combination with substantially identical body tile, the joint sides of each tile being accurately conformed to a radial plane of the silo and having a longitudinal channel separated from the adjacent longitudinal corners of the tile by a joint bearing-surface, and each tile having parallel top and bottom ends and one or more grooves extending longitudinally across one end and a like number of tongues extending correspondingly across the other end of much less projection than the depth of the grooves and assembled in the silo with the tongues of each tile entering the grooves of the next tile, above or below, caulking material filling one or more of the grooves of each tile and also filling the channels of the vertical joints, and hoops for retaining the parts in place.

3. In a silo the combination with substantially identical body tile, the joint sides of each tile being accurately conformed to a radial plane of the silo and having a longitudinal channel separated from the adjacent longitudinal corners of the tile by a joint bearing-surface, and each tile having parallel top and bottom ends and one or more grooves extending longitudinally across one end and a like number of tongues extending correspondingly across the other end of much less projection than the depth of the grooves and assembled in the silo with the tongues of each tile entering the grooves of the next tile, above or below, caulking material filling one or more of the grooves of each tile and also filling the channels of the vertical joints, and hoops for retaining the parts in place, the tile being assembled to break joints horizontally.

4. In a silo the combination with substantially identical hollow body tile, the joint sides of each tile being accurately conformed to a radial plane of the silo and having a longitudinal channel separated from the adjacent longitudinal corners by a joint bearing surface, the channel on one side being narrower than the other and having marginal tongues which enter the wider channel of the next adjacent tile, and each tile having parallel top and bottom ends and a plurality of grooves extending longitudinally across one end and a like number of tongues extending correspondingly across the other end of much less projection than the depth of the grooves and assembled in the silo with the tongues of each tile entering the grooves of the next tile, above or below, caulking material filling one or more of the grooves of each tile and also filling the channels of the vertical joints and hoops for retaining the parts in place.

In testimony whereof we affix our signatures.

WALTER BRASSERT.
GLENN V. GLADVILLE.